United States Patent
Hodgson et al.

(10) Patent No.: US 7,259,914 B2
(45) Date of Patent: Aug. 21, 2007

(54) ATTENUATOR FOR HIGH-POWER UNPOLARIZED LASER BEAMS

(75) Inventors: Norman Hodgson, Belmont, CA (US); H. Yang Pang, San Jose, CA (US)

(73) Assignee: Coherent, Inc., Santa Clara, CA (US)

( * ) Notice: Subject to any disclaimer, the term of this patent is extended or adjusted under 35 U.S.C. 154(b) by 0 days.

(21) Appl. No.: 11/214,553

(22) Filed: Aug. 30, 2005

(65) Prior Publication Data
US 2007/0047081 A1    Mar. 1, 2007

(51) Int. Cl.
*G02B 5/30* (2006.01)
*G02B 27/28* (2006.01)

(52) U.S. Cl. .............. 359/499; 359/497; 359/495; 359/638

(58) Field of Classification Search .............. 359/499, 359/495, 629
See application file for complete search history.

(56) References Cited
U.S. PATENT DOCUMENTS

| | | | |
|---|---|---|---|
| 5,740,288 A * | 4/1998 | Pan | 385/11 |
| 5,877,876 A * | 3/1999 | Birdwell | 349/39 |
| 6,059,555 A | 5/2000 | Barenboim et al. | 425/135 |
| 6,330,097 B1 | 12/2001 | Chen et al. | 359/239 |
| 6,850,544 B2 | 2/2005 | Friesem et al. | 372/19 |
| 2004/0201880 A1* | 10/2004 | Lee | 359/326 |
| 2005/0143720 A1* | 6/2005 | Yamada et al. | 606/10 |

FOREIGN PATENT DOCUMENTS

JP        02234114 A  *  9/1990

* cited by examiner

*Primary Examiner*—Stephone B. Allen
*Assistant Examiner*—Aline D McNaull
(74) *Attorney, Agent, or Firm*—Stallman & Pollock LLP

(57) ABSTRACT

A method for attenuating an unpolarized laser beam includes separating the laser beam into two plane-polarized beams. The plane-polarized beams are polarization rotated. Each of the polarization-rotated beams is separated into two plane-polarized portions. One of the portions of one polarization-rotated beam is combined with one of the portions of the other polarization-rotated beam to provide an attenuated output-beam.

8 Claims, 2 Drawing Sheets

ATTENUATOR FOR HIGH-POWER UNPOLARIZED LASER BEAMS

TECHNICAL FIELD OF THE INVENTION

The present invention relates in general to laser beam attenuators. The invention relates in particular to laser beam attenuators including polarizing and polarization rotating elements.

DISCUSSION OF BACKGROUND ART

In many applications of high-power lasers, particularly applications of Q-switched, high-power, pulsed lasers, it is often desirable to be able to provide variable attenuation of the laser output. Commonly-used high-power Q-switched solid state lasers often provide an output beam that is unpolarized. If laser pump power delivered to the laser is changed, for example, to change output power at a selected level, this can cause a substantial change in thermal lensing of the solid-state gain-medium and a consequent change in the quality of the output beam and the beam pointing. Both of these parameters are critical in applications that are beam-position sensitive, for example, in applications where the beam must be focused into an optical fiber. For the applications that need variable pulse energy in an output beam, there is a need to have an apparatus that that is insensitive to the degree of polarization of laser output and can provide variable pulse energy without varying the pump power to the laser thereby maintaining optimum beam quality and pointing.

SUMMARY OF THE INVENTION

The present invention is directed to a method and apparatus for providing a laser beam of variable power. The method relies on providing a variable attenuator for selectively attenuating an output beam of a laser, rather than varying operating parameters of the laser to provide selectively variable output power.

In one aspect the invention comprises separating an output beam from the laser into two beams, plane-polarized in different planes. Each of the two plane-polarized beams is divided into two portions. One of the portions of one of the plane-polarized beams is combined with one of the portions of the other plane-polarized beam to provide an attenuated output beam.

In another aspect of the invention, the laser output beam is separated into first and second beams plane-polarized in respectively first and second planes in respectively first and second orientations. The polarization plane of each of the first and second plane-polarized beams is rotated to respectively third and fourth orientations different from the first and second orientations. Each of the polarization-rotated first and second beams is separated into first and second portions plane-polarized in respectively the first and second orientations. An attenuated output beam is provided by either combining the first portion of the polarization-rotated first beam with the second portion of the polarization-rotated second beam, or, alternatively, combining the second portion of the polarization-rotated first beam with the first portion of the polarization-rotated second beam.

Preferably the polarization planes of the first and second plane polarized beams are rotated through the same angle. This provides that the attenuation of the beam is independent of the polarization state of the laser output beam.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain the principles of the present invention.

DETAILED DESCRIPTION OF THE INVENTION

Figure 1:
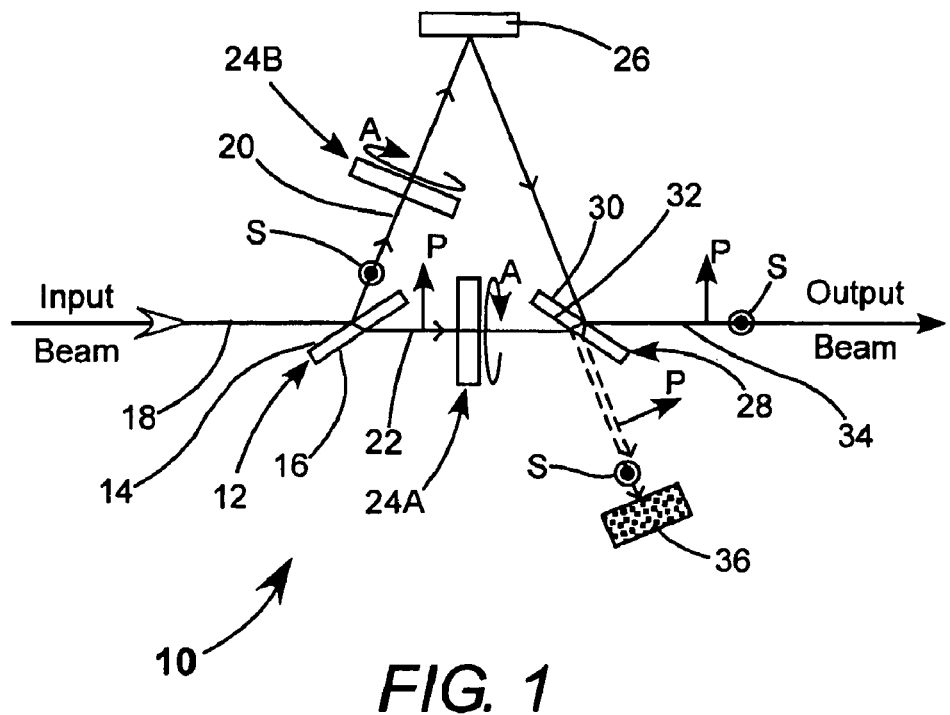
FIG. 1 schematically illustrates one preferred embodiment of an attenuator in accordance with the present invention including a Brewster-angle oriented, front-surface thin-film polarizing beamsplitter, a Brewster-angle oriented, front-surface thin-film polarizing beam-combiner, and two rotatable half-wave plates.

Referring now to the drawings, wherein like components are designated by like reference numerals, FIG. 1 schematically illustrates a preferred embodiment 10 of a laser beam attenuator in accordance with the present invention. Attenuator 10 includes a polarizing beamsplitter 12 having a thin film polarizer coating (not shown) on a surface 14 thereof. Beamsplitter 12 is preferably inclined at the Brewster angle to a path 18 along which an input laser beam to be attenuated is directed into the attenuator. The polarizing beamsplitter coating divides the input beam into two plane-polarized components. One of the components is plane-polarized perpendicular to the plane of incidence of the beam on the beamsplitter (here perpendicular to the plane of the drawing) and is reflected from the polarizing beamsplitter coating along a path 20. This component is usually referred to by practitioners of the art as being S-polarized and is indicated in FIG. 1 by an end-on arrowhead S. The other component is plane-polarized parallel to the plane of incidence of the beam on the beamsplitter (here parallel to the plane of the drawing) and is transmitted through the polarizing beamsplitter coating along a path 22. This component is usually referred to by practitioners of the art as being P-polarized and is indicated in FIG. 1 by an arrow P. Having the polarizing beamsplitter arranged at the Brewster angle optimizes the polarization properties of the beamsplitter coating and provides near-zero transmission loss (negligible reflection loss) at rear surface 16 of the beamsplitter. If the beamsplitter is arranged at some angle other than the Brewster angle it may be found advisable to provide an antireflection coating on surface 16.

Located in each of beam paths 20 and 22 is a half-wave plate (polarization rotator) 24A and 24B. A half-wave plate rotates the plane of polarization of a beam, dependent on the angle of the input polarization plane to the optic axis (fast or slow) of the half-wave plate. When the optic axis is aligned with the polarization plane of the input beam there is no rotation of the polarization plane. When the optic axis is aligned at ±45°(±π/4 Radians) to the beam the polarization plane is rotated by ±90°. Plates 20 and 22 can be synchronously rotated about the respective beam paths as indicated by arrows A.

Path 22 extends through the half-wave plate therein to another polarizing beamsplitter 28 which also serves as a beam combiner. Polarizing beamsplitter 28 is configured similarly to polarizing beamsplitter 12, but oriented at Brewsters angle to the path in an opposite sense. Here it is assumed that the polarizing coating is on surface 30 of the beamsplitter. If the axis of the half-wave plate is aligned with the polarization plane, light exiting the half-wave plate will still be P-polarized with respect to beamsplitter 28 and will be maximally transmitted by the beamsplitter along a path 34. If there is an alignment of optic axis of the half wave-plate with the polarization plane that is not zero or one-hundred-eighty degrees, light exiting the half-wave plate will be rotated out of the P-orientation, and will be resolved by polarizing beamsplitter 28 into a P-polarized component that is transmitted through the beamsplitter along path 34 and an S-polarized component that is reflected from the beamsplitter to a beam dump 36 as indicated in FIG. 1 by a dashed line. It should be noted, for completeness of explanation, that a part of the S-polarized component will be reflected from surface 32 of the beamsplitter into the beam dump.

Path 20 is "folded" by a mirror 26 an directed back onto surface 30 of polarizing beamsplitter 28 at a position such that any radiation reflected by the beamsplitter out of path 20 as S-polarized radiation is directed along path 34 and combines with any radiation from path 22 transmitted by the beamsplitter as P-polarized radiation. In this regard, the polarizing beamsplitter is functioning as a beam combiner. Any radiation from path 20 transmitted by beamsplitter 28 is P-polarized and makes an essentially loss free pass through surface 32 to beam dump 36 as indicated by a dashed line in FIG. 1.

Each half-wave plate is preferably initially calibrated to determine the 100% transmission orientation for the polarization state that will be incident on the half-wave-plate. When both plates are in this orientation there will be maximum throughput into the output beam of the attenuator. For radiation at most wavelengths greater than about 400 nanometers (nm), maximum throughput will usually be close to 100%, with perhaps about 3% being lost due to scatter and absorption losses or manufacturing tolerances on the reflection and transmission of the beamsplitter coatings.

In order to attenuate radiation, both half-wave plates are preferably rotated synchronously, i.e., through the same angle, from the calibrated 100% throughput orientation, to a new orientation. Here it should be noted that the term "synchronously" as used in this description and the appended claims does not mean that the plates must be rotated simultaneously (although this is an option), but merely that rotating one will require rotation of the other. In this new orientation, the polarization plane of light transmitted by the half-wave plates is rotated, unwanted light is directed out of the attenuator to the beam dump, and the remaining light is recombined as output along path 34 by the optical processes discussed above. Variable power can thus be provided by optimizing the beam quality of a laser, operating the laser stably at a constant output power, and using the attenuator to reduce that power as described above, as required. If there are any changes in the state of polarization of the input beam, the attenuation provided by the attenuator will stay the same, whatever magnitude are the P and S polarized components resolved by polarizing beamsplitter 12, as those components are equally attenuated. By way of example, if an input beam having an initial power W is resolved into P and S-polarized components having power a*W and b*W respectively (where a+b=1), and each is attenuated by a factor x, then the P and S-polarized components in the output beam of path 34 will have power x*a*W and x*b*W, respectively, providing a total power of x*(a+b)*W, i.e., x*W, whatever the value of a and b.

Figure 2:
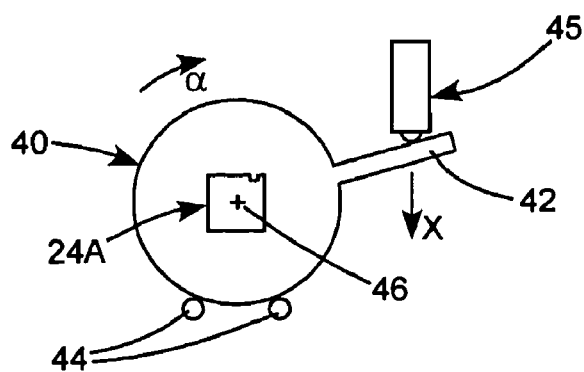
FIG. 2 schematically illustrates one example of an arrangement for rotating a half-wave plate in the attenuator of FIG. 1.

FIG. 2 schematically illustrates an example of one mechanism by which the polarizers can be rotated by a computer operable actuator. Here the half-wave plate 24 is a square plate and is held centrally in a circular holder 40 having a radial arm 42 extending therefrom. Holder 40 is peripherally supported on roller bearings 44. An actuator 45 moves arm 42 linearly, as indicated by arrow X. This causes the plate to rotate around a rotation axis 46 of the circular portion of the holder. One suitable actuator is a micrometer screw driven by an encoded shaft drive or servo motor.

Axis 46 is aligned with that beam path (20 or 22) in which the half-wave plate is rotated. The rotation angle as a function of translation of the actuator in the X direction will depend on the radial distance of the actuator from axis 46. This rotation mechanism is but one computer operable mechanism for rotating the half-wave plate. Those skilled in the art may devise other computer operable rotation mechanisms without departing from the spirit and scope of the present invention. By way of example a holder for a half-wave may be provided with peripheral gear teeth, supported on a pair of mating idler gear wheels, and rotated by a worm gear meshing with the peripheral gear teeth and driven by a servo motor.

Figure 3:
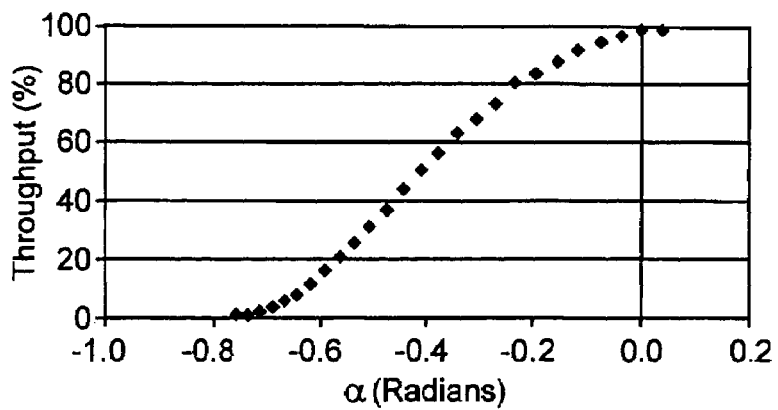
FIG. 3 is a graph schematically illustrating measured percentage throughput as a function of the rotation angle of the half-wave plates in one example of the attenuator of FIG. 1.

FIG. 3 is a graph is a graph schematically illustrating measured percentage throughput as at a number of different rotations (orientations) α in radians of the half-wave plates in one example of the attenuator of FIG. 1. The actual measured maximum transmission value is about 97% and the polarization extinction ratio along either of the beam paths is greater than 100:1. This means that the attenuator is capable of providing controllable attenuation to throughputs down to about 1% or less of the input power. It can be seen from the graph that the maximum transmission value does not coincide with the nominal (α=0.0) orientation suggested by the half-wave-plate manufacturer's indication of the optic-axis orientation. Correspondingly, maximum attenuation does not occur at exactly 45° (0.785 radians). These discrepancies can be caused by one or more factors including, but not limited to, residual or mounting stress birefringence in the polarizing beamsplitter substrates, manufacturing tolerances on the waveplates, and misalignment of the polarizing beamsplitters one with the other. This highlights the importance of calibrating each half-wave plate individually to find the actual 100% throughput orientation before connecting the mechanism for synchronous rotation of the half-wave plates.

Information of the type shown by the graph can be stored in computer memory as look-up table. A computer control sequence for a laser and an attenuator can provide a sensor cooperative with a controller, with the controller being responsive to user input, and having the look-up table electronically stored therein. In response to a user-input requesting a specific output beam power from the attenuator, the controller can calculate the attenuation required (or a new value of attenuation if the beam is already being attenuated), consult the look-up table to determine the value of α required (or the actuator setting which provides that value of α) and activate the actuator to synchronously rotate both half-wave plates to the required α value. Alternatively, output power of the attenuator can be monitored by, and a desired output power established and maintained, by the controller comparing the monitored power with the desired power and rotating the half-wave plates until the desired power is reached, and then periodically fine-adjusting the angle of the half-wave plates, if necessary, to maintain the desired power output.

Figure 4:
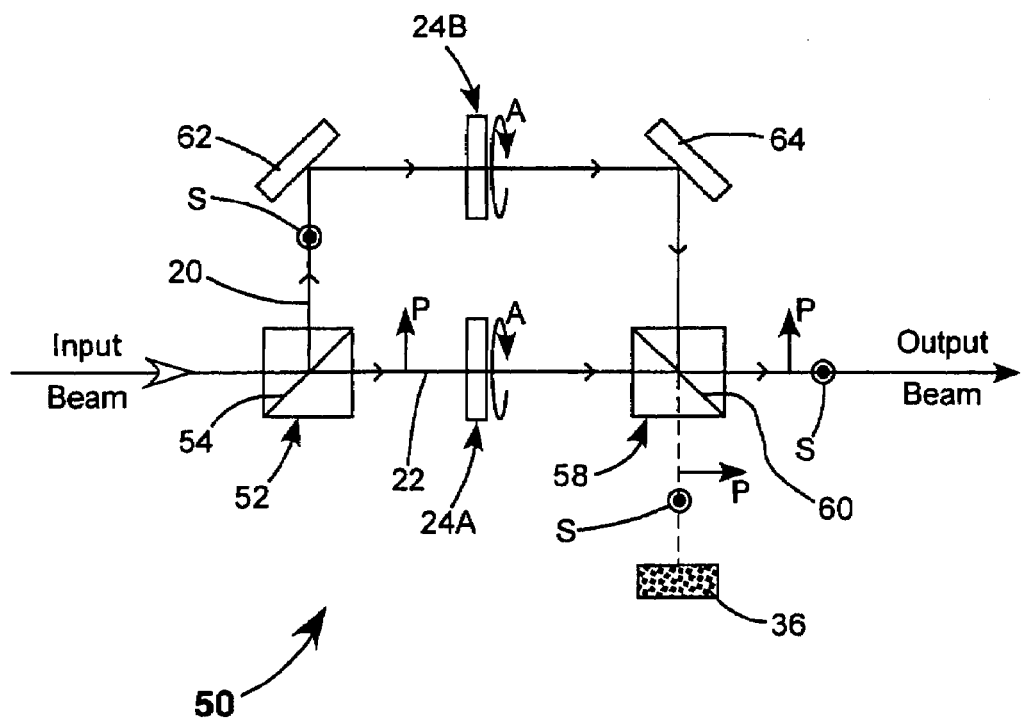
FIG. 4 schematically illustrates another preferred embodiment of attenuator in accordance with the present invention including a 45-degree biprism polarizing beamsplitter, a 45-degree biprism polarizing beam combiner, and two rotatable half-wave plates.

FIG. 4 schematically illustrates another preferred embodiment 50 of a laser beam attenuator in accordance with the present invention. Attenuator 50 operates according to the same principle as attenuator 10 of FIG. 1 but employs 45° biprism-type polarizing beamsplitters 52 and 58 in place of front-surface Brewster-oriented polarizing beamsplitters 12 and 28. Polarizing beamsplitters 52 and 58 have internal surfaces 54 and 60 created by optically bonding two prisms together to form the biprism. Each internal surface includes a thin film polarizing coating (not shown). The internal surfaces are oriented at 45° to entrance and exit faces of the biprism and these faces are oriented perpendicular to beam paths. Two turning mirrors 62 and 64 are required for folding path 20 back to polarizing beamsplitter 58 to be recombined with path 22 in common path 34. Beamsplitters 52 and 58 are sometimes referred to as cube-beamsplitters. Those skilled in the art will recognize, however, that a biprism-type polarizing beamspitter can have an internal surface that is at some angle other than 45° to an entrance or exit face, and need not be cubic.

One advantage of a biprism-type polarizing beamsplitter is that polarization can be provided over a broad spectral bandwidth, for example over a three to four hundred nanometers. Front-surface polarizers by comparison are effective only over a few tens of nanometers at best. Accordingly, attenuator 50 could be used with a wide range of lasers changing only the half-wave plates for a particular laser wavelength, while in attenuator 10 beamsplitters 12 and 28 in addition must usually be configured for one particular laser wavelength. Another advantage of attenuator 50 is that the "dumped" beam-portions are combined on a common path. Those skilled in the art will recognize, without further illustration or detailed description, that an alternative embodiment of the present invention is possible, similar to the embodiment of FIG. 4, but wherein the combined "dumped" beam-portions of FIG. 4 become the output beam, and the output beam portions FIG. 4 become the "dumped" beam-portions.

One disadvantage of the biprism beamsplitters is that antireflection coatings would be required to eliminate Fresnel losses at entrance and exit faces. Another disadvantage is that such biprisms often exhibit a stress birefringence (residual or due to bonding the prisms) sufficient that the "crossed" orientation of the prisms may be up to 10° or greater different from a presumed (ideal) 90° orientation of one with respect to another. This can make calibration of an attenuator such as attenuator 50 particularly difficult and may lead to maximum-throughput restrictions.

In summary, the present invention is described above in terms of a preferred and other embodiments. The invention is not limited, however, to the embodiments described and depicted. Rather, the invention is limited only by the claims appended hereto.

What is claimed is:

1. An apparatus for attenuating the power of a laser beam from an initial level to a lower target level, comprising:

first and second polarizing beamsplitters and at least one reflector, each of said polarizing-beamsplitters arranged to transmit radiation plane-polarized in a first orientation and reflect radiation plane-polarized in a second orientation;

said first and second polarizing beamsplitters and said at least one reflector being arranged such that said first polarizing beamsplitter receives the beam to be attenuated and divides the beam into a first component transmitted along a first path to said second beamsplitter and a second component reflected along a second path, including said reflector, to said second beamsplitter;

said first and second beamsplitters and said at least one reflector being further arranged such that any portion of said first beam-component transmitted by said second polarizing beamsplitter propagates along a common path with any portion of said second beam-component reflected by said second polarizing beamsplitter;

first and second polarization rotators located in respectively said first and second beam paths wherein said first polarization rotator is rotatable about an axis aligned with said first beam path and said second polarization rotator is rotatable about an axis aligned with said second beam path in a manner to selectively vary the polarization orientation of said first and second beam components; and means for synchronously controlling the orientation of the polarization rotators so that the sum of the power of said portion of the first beam-component transmitted by said second polarizing beamsplitter and said portion of said second beam-component reflected by said second polarizing beamsplitter corresponds to said target level and will remain substantially at that target level even if an initial polarization state of the laser beam varies.

2. The apparatus of claim 1, wherein said first and second polarization orientations are perpendicular to each other.

3. The apparatus of claim 1, wherein said first and second polarizing beamsplitters are front-surface polarizing beamsplitters.

4. The apparatus of claim 1, wherein said first and second polarizing beamsplitters are internal-surface biprism-type polarizing beamsplitters.

5. The apparatus of claim 4, wherein any portion of said first beam component reflected by said second polarizing beamsplitter propagates along a common path with any portion of said second beam component transmitted by said second polarizing beamsplitter.

6. The apparatus of claim 1, wherein each of said first and second polarization rotators is a half-wave plate.

7. An apparatus for attenuating the power of an unpolarized light beam from an initial level to a lower target level comprising:

a polarizing beam splitter for dividing the light beam along two paths;

a pair of polarization rotators, one of each being located in one of said two paths, each said rotator being rotatable about an axis aligned with the respective path in a manner to selectively vary the polarization orientation of the light passing therethrough;

a polarizing beam combiner positioned at an intersection of the two paths downstream from said polarization rotators, said combiner for reflecting a portion of the light from each path and transmitting a portion of the light from each path; and means for synchronously controlling the orientation of the polarization rotators such that the ratio of the light transmitted by the combiner with respect to the light reflected by the combiner can be varied such that the power of one of the light either transmitted or reflected by the beam combiner corresponds to said target level and will remain substantially at that target level even if an initial polarization state of the laser beam varies.

8. The apparatus of claim 7, wherein the polarization rotators are controlled so that the amount of polarization rotation in each path is the same.

* * * * *